United States Patent
Yoon

(10) Patent No.: US 10,224,142 B2
(45) Date of Patent: Mar. 5, 2019

(54) RECONFIGURABLE DISTRIBUTED ACTIVE WIRELESS CHARGING SYSTEM

(71) Applicant: Avago Technologies International Sales Pte. Limited, Singapore (SG)

(72) Inventor: Seunghwan Yoon, Irvine, CA (US)

(73) Assignee: Avago Technologies International Sales Pte. Limited, Singapore (SG)

(*) Notice: Subject to any disclaimer, the term of this patent is extended or adjusted under 35 U.S.C. 154(b) by 472 days.

(21) Appl. No.: 14/630,315

(22) Filed: Feb. 24, 2015

(65) Prior Publication Data

US 2016/0226292 A1    Aug. 4, 2016

Related U.S. Application Data

(60) Provisional application No. 62/111,452, filed on Feb. 3, 2015.

(51) Int. Cl.

| | |
|---|---|
| H02J 7/00 | (2006.01) |
| H01F 27/28 | (2006.01) |
| H01F 38/14 | (2006.01) |
| H02J 50/10 | (2016.01) |
| H02J 50/40 | (2016.01) |
| H02J 50/90 | (2016.01) |
| H02J 50/80 | (2016.01) |

(52) U.S. Cl.
CPC ......... *H01F 27/2804* (2013.01); *H01F 38/14* (2013.01); *H02J 50/10* (2016.02); *H02J 50/40* (2016.02); *H01F 2027/2809* (2013.01); *H02J 50/80* (2016.02); *H02J 50/90* (2016.02)

(58) Field of Classification Search
CPC ...................................................... H02J 7/025
USPC ........................................................ 320/108
See application file for complete search history.

(56) References Cited

U.S. PATENT DOCUMENTS

| | | | | |
|---|---|---|---|---|
| 6,433,781 B1* | 8/2002 | Oda | ............... | G06F 3/0346 |
| | | | | 345/156 |
| 7,433,655 B2* | 10/2008 | Jacobs | ............... | A61N 1/3787 |
| | | | | 320/101 |
| 7,952,322 B2* | 5/2011 | Partovi | ............... | H02J 7/025 |
| | | | | 320/108 |

(Continued)

FOREIGN PATENT DOCUMENTS

| | | |
|---|---|---|
| CN | 101714767 | 5/2010 |
| CN | 102035221 | 4/2011 |

(Continued)

OTHER PUBLICATIONS

Office Action from CN Application No. 201610074736.2, dated Dec. 14, 2017, 7 pages.

(Continued)

*Primary Examiner* — Yalkew Fantu
(74) *Attorney, Agent, or Firm* — Foley & Lardner LLP

(57) ABSTRACT

A system and method utilizes an array of unit coils for wireless charging and/or near field communication. The array of unit coils can be configured to provide magnetic fields of various shapes to accommodate consuming devices and/or to accommodate types of devices. The array of unit coils can be any type of coils (e.g., eccentric coils that provide a concentrated current field and a strong magnetic field). The array of unit coils can be powered by one or more power sources.

20 Claims, 12 Drawing Sheets

(56) References Cited

U.S. PATENT DOCUMENTS

| | | | | |
|---|---|---|---|---|
| 2002/0037756 A1* | 3/2002 | Jacobs | ............ | A61N 1/3787 455/572 |
| 2011/0074349 A1* | 3/2011 | Ghovanloo | ............ | H02J 5/005 320/108 |
| 2014/0340031 A1* | 11/2014 | Mi | ............ | H04B 5/0037 320/108 |
| 2015/0137601 A1* | 5/2015 | Fujita | ............ | H04B 5/0037 307/31 |

FOREIGN PATENT DOCUMENTS

| | | |
|---|---|---|
| CN | 102611215 | 7/2012 |
| CN | 104184217 | 12/2014 |

OTHER PUBLICATIONS

Office Action from CN Application No. 201610074736.2, dated Aug. 21, 2018, 4 pages.

* cited by examiner

RECONFIGURABLE DISTRIBUTED ACTIVE WIRELESS CHARGING SYSTEM

CROSS-REFERENCE TO RELATED APPLICATIONS

This application claims the benefit of and priority to U.S. Application No. 62/111,452, filed Feb. 3, 2015, entitled "Reconfigurable Distributed Active Wireless Charging System," which is hereby incorporated by reference herein in its entirety.

FIELD OF THE DISCLOSURE

This disclosure generally relates to systems for and methods of wireless charging and/or near field communication.

BACKGROUND OF THE DISCLOSURE

Wireless charging (also known as "inductive charging") uses inductive coils to provide an electromagnetic field that transfers energy from a charging source to a consuming device. Wireless charging can be used with various consuming devices, such as mobile devices (e.g. cellular phone, tablet, mobile computing device, etc.), electric vehicles, remote devices, medical devices, etc. Wireless chargers generally utilize a fixed inductive wire coil in the charging source and a fixed inductive wire coil in the consuming device. The coils in conventional wireless chargers are typically large and non-configurable.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

Figure 1:
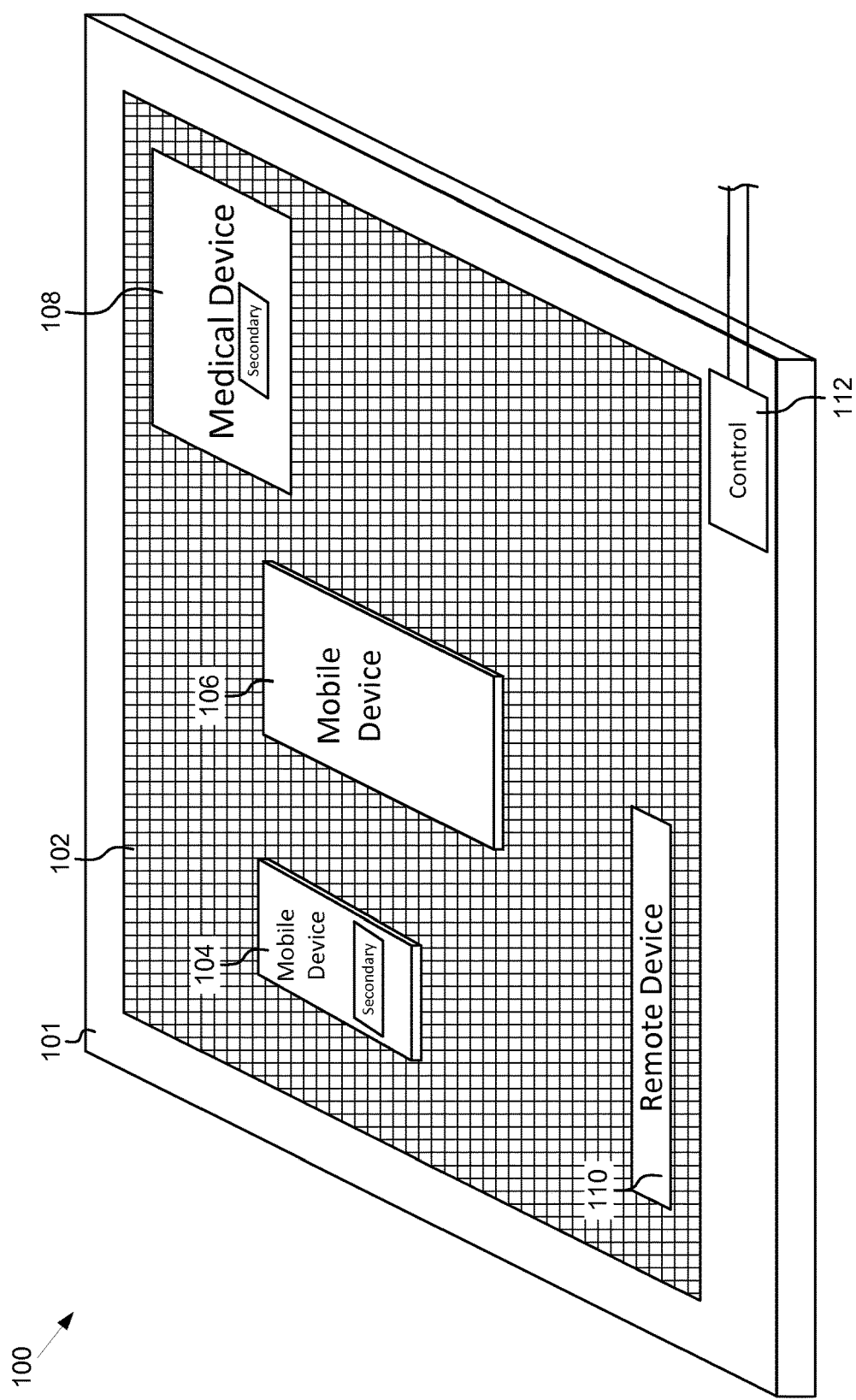
FIG. 1 is a perspective view drawing of a configurable wireless charging system according to some exemplary embodiments.

Before turning to the features, which illustrate the exemplary embodiments in detail, it should be understood that the application is not limited to the details or methodology set forth in the description or illustrated in the figures. It should also be understood that the terminology is for the purpose of description only and should not be regarded as limiting.

Referring generally to the figures, systems for and methods of wireless charging are shown according to various exemplary embodiments. The systems and methods are configurable or reconfigurable, distributed, and/or active in some embodiments. In one or more embodiments, a device is wirelessly charged by configuring an array of unit coils in a wireless charging system. In some embodiments, more efficiency of power transfer is achieved by using the unit coils when compared to using larger, conventional fixed coils.

In some embodiments, a method of charging a device configures an array of unit coils and provides a magnetic field via the array of unit coils. In some embodiments, a magnetic induction device includes an array of unit cells. Each cell is comprised of two eccentric coils in some embodiments. In some embodiments, a magnetic induction device includes an array of unit coils configured for coupling separately to a power source and the array is configurable to provide two or more rings of charging lines.

In some embodiments, the array of unit coils can be configured to provide a magnetic field that transfers energy from a charging source to a consuming device. In some embodiments, the array of unit coils are configured to provide multiple magnetic fields that transfer energy from one or more charging sources to multiple consuming devices. In one or more embodiments, the unit coils have magnetic field producing structures. In some embodiments, the unit coils include one or more pairs of orthogonal eccentric coils. In some embodiments, the eccentric coils have a central concentrated structure that provides a central concentrated current field. In some embodiments, the unit coils have small dimensions. In some embodiments, the unit coils are disposed on one or more printed circuit board conductive layers.

In some embodiments, the systems and methods of the present disclosure are used in a magnetic induction device. The magnetic induction device can include an array of unit coils that is configured for coupling separately to a power source. The array of unit coils can be further configured to provide two or more rings of flux lines. The two or more rings of flux lines can serve as a primary field to produce electromagnetic induction. In some embodiments, the magnetic induction device includes an array of unit cells and each cell further includes two pairs of eccentric coils. The two pairs of eccentric coils are disposed in different directions. Each unit cell can be configured to provide a magnetic field in any or almost any direction through the combination of two magnetic fields created by the pair of eccentric coils.

FIG. 1 is a diagram of a wireless charging system according to an exemplary embodiment. Referring to FIG. 1, a wireless charging system 100 includes a magnetic induction device 101, mobile devices 104 and 106, a medical device 108, and a remote device 110. In some embodiments, wireless charging system 100 is a reconfigurable or configurable, distributed, active charging system.

In some embodiments, magnetic induction device 101 is a charging platform that provides one or more magnetic fields and transfers energy to one or more mobile devices 104 and 106, medical device 108, and remote device 110 located in the one or more magnetic fields. In some other embodiments, magnetic induction device 101 is used for near field communication. For example, magnetic induction device 101 can be used as magnetic flow meter, transformer, electrical generator, etc.

Magnetic induction device 101 includes an array of unit cells or unit coils 102 and a control system 112. Each of unit coils 102 can be configured to provide a unit magnetic field in some embodiments. Array of unit coils 102 can be further configured to combine multiple unit magnetic fields to form one magnetic field as a primary magnetic field. In some embodiments, the combined primary magnetic field has two or more rings of charging lines.

In some embodiments, an array of unit coils 102 is disposed on a printed circuit board. Each of unit coils 102 includes a pair of coils in some embodiments. Each coil in the pair of unit coils 102 is disposed in a different direction (e.g., horizontal and vertical directions). In some embodiments, unit coils 102 include any type of conductive material and have an eccentric shape. In some embodiments, multiple unit coils 102 in the array are connected to a power source in parallel, so that array of unit coils 102 combines the parallel power source inputs to generate a higher power in a small form factor. In some embodiments, multiple unit coils 102 in the array are connected to a power source in series. In other embodiments, some of the unit coils 102 are connected to the power source in series and others are connected in parallel. The parallel connection also allows each of unit coils 102 to be controlled by the power source individually. Control system 112 can control the amount of power and can connect mobile devices 104 and 106, medical device 108, and remote device 110 in parallel or series.

In some embodiments, control system 112 of magnetic induction device 101 includes sense circuitry or sensors to detect secondary coils in mobile devices 104 and 106, medical device 108, and remote device 110. Control system 112 is a hardware or combination hardware/software system that controls connections, power, and signals for providing the magnetic field of magnetic induction device 101 in some embodiments. Magnetic induction device 101 through operation of control system 112 and array of unit coils 102 are actively configured for type, size, and number of mobile devices 104 and 106, medical device 108, and remote device 110 in some embodiments. In some embodiments, the sensors of control system 112 are any type of sensors that detect secondary coils in the mobile devices 104 and 106, medical device 108, and remote device 110 or the size and shape of mobile devices 104 and 106, medical device 108, and remote device 110, such as, inductive sensors, optical sensors, mechanical sensors, etc.

In some embodiments, array of unit coils 102 is configured in a single device charging mode or a multiple device charging mode as controlled by control system 112. The operational mode depends on the detection of the number of mobile devices 104 and 106, medical device 108, and remote device 110 in some embodiments. In some embodiments, array of unit coils 102 is configured to turn on the selected unit coils 102 in operation and turn off all other unit coils 102 to save energy. In some embodiments, an array of unit coils 102 is composed with multiple types of unit coils 102.

Control system 112 is used to control and configure the array of unit coils 102 according to one or more embodiments. Control system 112 can include suitable logic, circuitry, and/or code that can enable controlling the operations of the magnetic induction device 101. Control system 112 can be operable to provide control signals to the array of unit coils 102 and the various other components of the magnetic induction device 101. Control system 112 can be operable to control transfers of data between various components of the magnetic induction device 101. Control system 112 can include one or more controllers.

Mobile devices 104 and 106, medical device 108 and remote device 110 are shown as exemplary consuming devices in wireless charging system 100. The consuming devices have inductive coils as secondary coils to receive the induction power transferred from the magnetic induction device 101. Mobile devices 104 and 106 can be any type of mobile computing device, such as, a cellular phone, a tablet, personal digital assistant, a GPS receiver, a mobile hot spot, a smart watch, an activity tracker, a computer, a notebook, a laptop, any device that utilizes charging or near field communication, etc. Mobile device 104 and mobile 106 have different types of secondary coils according to some embodiments. For example, mobile device 104 has a built-in coil, and mobile device 106 has a skin adapter that includes a coil. As shown in FIG. 1, mobile devices 104 and 106, medical device 108 and remote device 110 can be charged at any area of the array of unit coils 102, so that the array of unit coils 102 efficiently utilizes its area and shape. In some embodiments, any type of conductive coils in the consuming devices can be detected and coupled with respective unit coils.

Figure 2:
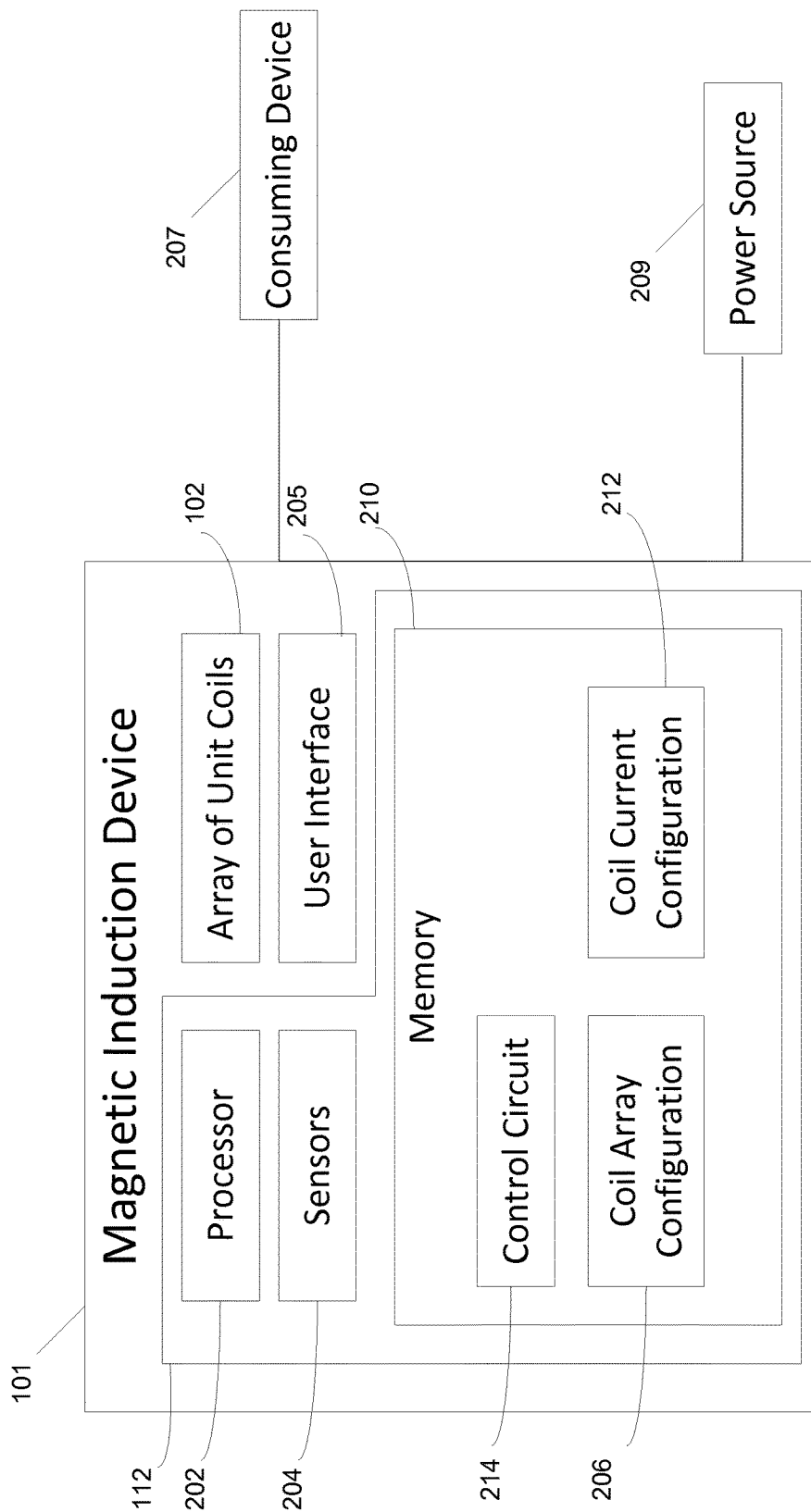
FIG. 2 is a general block diagram of the configurable wireless charging system illustrated in FIG. 1 according to some exemplary embodiments.

FIG. 2 is a block diagram of a wireless charging system according to an exemplary embodiment. Referring now to FIG. 2, in some embodiments, magnetic induction device 101 includes array of unit coils 102, a user interface 205, and control system 112 including a processor 202, multiple sensors 204, a coil array configuration module or circuit 206, a coil current configuration module or circuit 212, a memory 210, and a control circuit 214.

Processor 202 can include suitable logic, circuitry, and/or code that can enable processing data and/or controlling operations of magnetic induction device 101. Processor 202 can be a microprocessor operable to provide control signals through control circuit 214 to the various other components of magnetic induction device 101. Processor 202 can be operable to control transfers of data between various components of magnetic induction device 101. Processor 202 can be operable to execute programs comprising one or more instructions. The programs can, for example, instruct processor 202 for generating, parsing, coupling, optimizing, transmitting or otherwise processing data. The programs can, for example, instruct processor 202 for configuring or controlling operation of the various components of magnetic induction device 101. For example, the instructions can instruct the magnetic induction device 101 to perform various actions in response to detecting a consuming device 207 (e.g., one or more mobile devices 104 and 106, medical device 108, and remote device 110 in FIG. 1), such as configuring array of unit coils 102 according to the type of the coils in the detected devices. Processor 202 can be or include any type of general purpose or special purpose processor.

Control circuit 214 includes circuitry for providing connections (e.g., switches) and applying power from a power source 209 under the control of processor 202 in some embodiments. Control circuit 214 includes circuitry for interfacing with coil array configuration circuit 206, coil current configuration circuit 212 and array of unit coils 102 in some embodiments.

Sensors 204 are used to detect various parameters of the consuming device 207, such as coil type, position, power level, etc., in some embodiments. Sensors 204 include mechanical sensors such as pressure sensor, positional sensor, metal detector sensor, temperature sensor, motion sensor, etc. in some embodiments. The mechanical sensors are used to detect the location of consuming device 207 in some embodiments. For example, a pressure sensor is used to detect a consuming device 207 contacting the magnetic induction device 101 and send signals to the processor 202 and control circuit 214 in some embodiments. For example, a motion sensor is used to detect a movement of the consuming device 207 in order to reconfigure the unit coils 102 corresponding to the changed positions in some embodiments. Sensors 204 include electronic proximity sensors to detect a metallic object, such as a secondary coil in the consuming device 207 in some embodiments. The consuming device 207 can be detected without any contact to the magnetic induction device 101, which can be beneficial for charging certain unreachable devices (e.g., the electronic medical device implanted inside of a patient) in some embodiments. Sensors 204 can also include electromagnetic sensors to detect a state of power in the consuming device 207 in some embodiments. In some embodiments, sensors 204 are suitable logic and/or code that enable the circuits integrated with the array of unit coils 102 to detect corresponding parameters. In some embodiments, sensors 204 are hardware, such as various mechanical sensors. In some embodiments, sensors 204 are combinations of suitable logic, circuitry, code and hardware. In some embodiments, sensors 204 include circuitry for wirelessly detecting inductive characteristics of consuming device 207. The inductive characteristics can be used to determine the type of consuming device 207 in some embodiments.

User interface 205 can be used to input user's commands, such as start charge, select charging time, set charging level, set auto-off, etc. User interface 205 can be used to output various parameters of magnetic induction device 101 and consuming device 207, such as charging capacity, charging history, temperature, efficiency, power level, current value, etc. User interface 205 can include various input and output methods and systems, such as display, touch screen, voice control interface, motion control interface, buttons, speakers, etc.

Memory 210 is a storage device, such as a non-transitory medium. Memory 210 can include suitable logic, circuitry, and/or code that can be operable to store information, such as, instructions to be executed by processor 202, data generated by one or more components of magnetic induction device 101, data received via one or more components of magnetic induction device 101, and/or parameters for controlling operation of magnetic induction device 101. Memory 201 can store instructions for coil array configuration circuit 206 and coil current configuration circuit 212. Memory 210 can include any type of computer or machine-readable storage medium, such as, for example, SRAM, DRAM, flash memory, and/or magnetic storage. Parameters stored in memory 210 can include, for example, parameters detected from sensors 204, configuration histories, etc. In some embodiments, memory 210 can store user's preferences, such as, a start charging schedule for a medical device. The schedule can be a fixed or non-fixed schedule.

Coil array configuration circuit 206 includes suitable logic, a software module, hardware, circuitry, and/or code that can be operable to configure the array of unit coils 102 in some embodiments. Coil array configuration circuit 206 can configure each active unit coil 102 to create a desired unit magnetic field and a unit current field. Coil array configuration circuit 206 can further configure the array of unit coils 102 to combine the unit magnetic fields and form one magnetic field. In some embodiments, the combined magnetic field has two or more rings of charging lines. Coil array configuration circuit 206 can configure the magnetic field direction through vector summation of two or more magnetic vectors generated by two or more coils located in different directions. In some embodiments, coil array configuration circuit 206 receives instructions from processor 202 and control circuit 214 based on the detected data from sensors 204. In some embodiments, coil array configuration circuit 206 configures a path of operating unit coils 102 base on the optimization of power transmission efficiency. In some embodiments, processor 202 and coil array configuration circuit 206 senses inductive characteristics of consuming device 207 via sensors 204 and makes adjustments to the configuration of unit coils 102, power provided to unit coils 102, and/or frequency of the power signal provided to unit coils 102 for charging efficiency. The inductive characteristics provide feedback for increasing power transfer in some embodiments. The adjustments are made until peak inductive characteristics are sensed in some embodiments.

Coil current configuration circuit 212 includes suitable logic, a software module, hardware, circuitry, and/or code that can be operable to configure the array of unit coils 102 in some embodiments. Coil current configuration circuit 212 can configure each unit coils in the array to be active or inactive or to receive a particular magnitude of current. Coil current configuration circuit 212 can configure unit coils 102 to be coupled in a parallel to a power source 209. In some embodiments, coil current configuration circuit 212 configures the unit coil to be coupled in a series to a power source 209. In some embodiments, coil current configuration circuit 212 configures unit coils 102 to be coupled to multiple power sources and the multiple power sources that are different from each other. In some embodiments, coil current configuration circuit 212 configures some unit coils 102 to be connected to one or more power sources in parallel and other unit coils 102 to be connected to one or more power sources in series using control circuit 214. Coil current configuration circuit 212 can receive instructions from a user through user interface 205. For example, a user can choose a fast charging mode or a regular charging mode. Fast charge mode and regular charge can lead different current configurations. User interface 205 is optional in some embodiments.

Consuming device 207 can include any type of electric device that has a receiver (e.g., a coil receiver) or a device that can adapt to a coil receiver, such as mobile devices 104 and 106, medical device 108, remote device 110, an electric vehicle, etc. Consuming device 207 can be charged by the magnetic induction device 101 through different charging modes, such as a multiple device charging mode, single device charging mode, fast charging mode, regular charging mode, fully charging mode, etc. Different charging mode associates with different coil array configurations and coil current configurations (e.g., more current in a fast charging mode than in a regular charging mode). Consuming device 207 can communicate with the magnetic induction device 101 through user interface 205.

Power source 209 can include multiple unit power sources. Power source 209 can be an AC source that inputs AC power to magnetic induction device 101. Power source 209 can be a DC source according to some embodiments. A power converter can convert DC power to an AC power signal for charging via array of cells 102. Power source 209 can include multiple converters, such as AC-DC converter, AC-AC converter, DC-DC converter etc.

Figure 3:
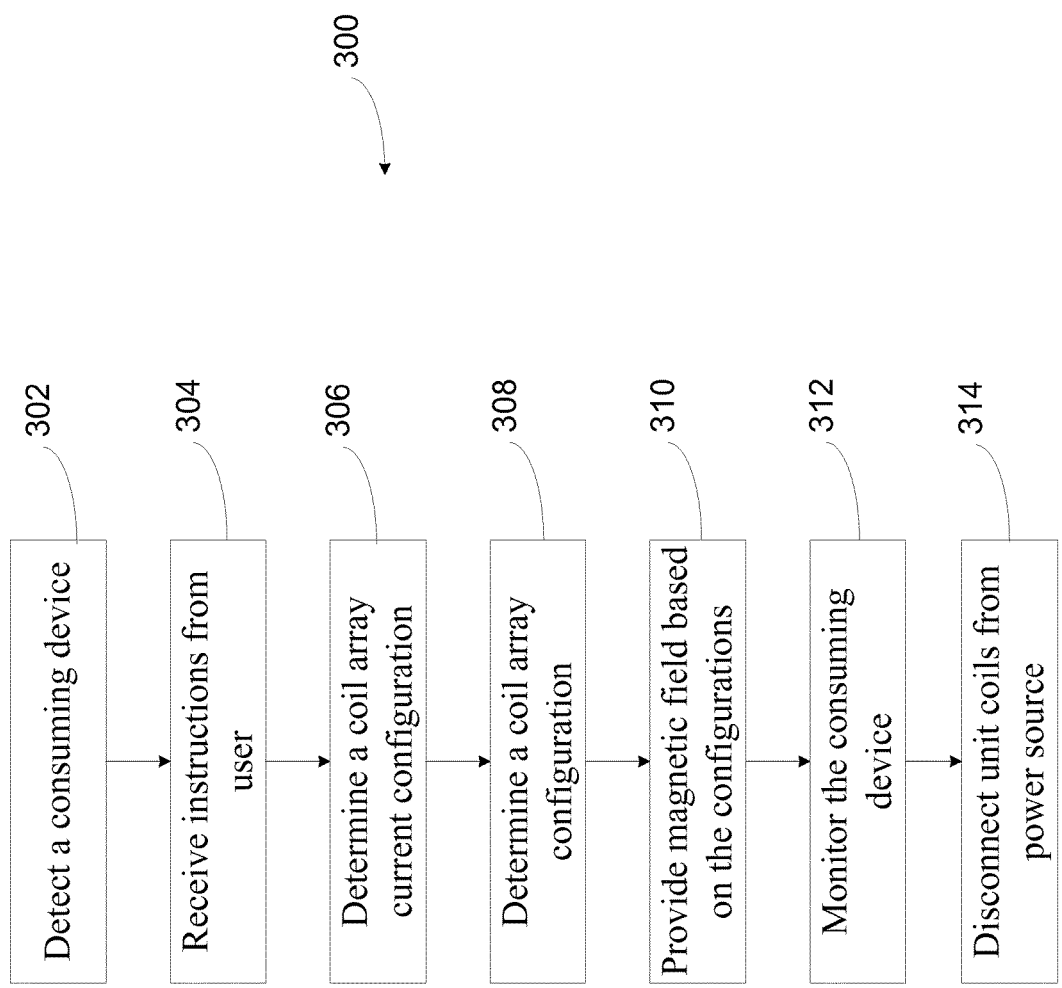
FIG. 3 is a flow diagram of a charging process for one or more consuming devices by a magnetic induction device according to some exemplary embodiments.

FIG. 3 is a flow diagram of a flow for charging one or more consuming devices by a magnetic induction device according to an exemplary embodiment. Referring now to FIG. 3, in an operation 302 of flow 300, magnetic induction device 101 detects one or more consuming devices 207 by various sensors 204. For example, when consuming device 207 is located close enough to magnetic induction device 101, an electronic proximity sensor detects the consuming device 207 in some embodiments. An electromagnetic sensor detects power level and coil type of the consuming device 207 in some embodiments. In some embodiments, an identity of consuming device 207 is detected (e.g., by a BLUETOOTH® interface or by sensing characteristics of consuming device 207). A charging profile associated with the detected consuming device 207 is extracted from memory 210 in some embodiments. The charging profile can include information about the consuming device 207, such as user preferred charging mode, charging levels, charging history, coil type, charging time, etc. Operation 302 can also include outputting detected information about consuming device 207 through user interface 205.

A user can input instructions through user interface 205 based on the detected information of the consuming device 207 in an operation 304. For example, a user can instruct the magnetic induction device 101 to operate a multiple device charging mode where a mobile device is instructed to operate in a fast charging mode, and a medical device is instructed in a regular charging mode in order to prevent a high heat generated by the secondary coil in the medical device. Processor 202 receives the instructions from the user according to one or more embodiments. In some embodiments, charging is performed without user input or automatically. Operation 304 is optional in some embodiments.

Processor 202 determines a coil array current configuration at an operation 306 based on user's instruction and/or based upon detected information related to consuming device 207 in some embodiments. For example, if the user instructs a regular charging mode for a medical device, the unit coils 102 that correspond to the type of the secondary coils can be configured to be coupled to a lower power source. In some embodiments, determining a coil array current configuration in operation 306 includes determining which unit coils 102 correspond to the detected secondary coils and activating the corresponding unit coils 102 by connecting the unit coils 102 to one or more power sources. In some embodiments, determining a coil array current configuration includes determining the current level in each circuit formed by one or more coils.

The active unit coils 102 are configured to generate a magnetic field based on the detected information and/or user's instructions in an operation 308 in some embodiments. In some embodiments, the unit coils 102 are formed by a pair of coils disposed in different directions. Each coil in unit coils 102 is configured to generate a magnetic vector in some embodiments. Thus, unit coils 102 generate at least a pair of magnetic vectors in some embodiments. A unit magnetic vector can be generated according to a summation of the pair of magnetic vectors. The unit magnetic vector represents a unit magnetic field provided in an operation 310. In some embodiments, each unit coil 102 includes only one coil or more than a pair of coils.

The combination of all unit coils 102 creates a magnetic field that serves as a primary coil magnetic field in some embodiments. In some embodiments, if multiple consuming devices 207 are detected, unit coils 102 are configured to form multiple primary coil magnetic fields for coupling to the multiple detected secondary coils in the multiple consuming devices. The primary magnetic field generated by unit coils 102 induces a voltage in the magnetically coupled secondary coil in some embodiments. The induced voltage can be used to charge consuming device 207.

One or multiple sensors 204 are used to monitor consuming device 207 while charging in an operation 312 in some embodiments. Operation 312 is optional in some embodiments. For example, an electromagnetic sensor can be used to monitor the induced voltage in consuming device 207 (FIG. 2) to avoid over heating the device and to monitor the power level in the consuming device 207. In some embodiments, a power level of consuming device 207 is monitored and displayed to user.

When the power level reaches to a desired level, unit coils 102 are disconnected from power source 209 in an operation 314 in some embodiments. In some embodiments, when the power level reaches to the desired level, unit coils 102 are still connected to the power source 209 and a standby mode is entered in order to maintain a desired power level in consuming device 207. In some embodiments, unit coils 102 are reconfigured based on the monitored results. For example, when a mobile device is fully charged, the unit coils are reconfigured with a new current level for a standby mode. In some embodiments, magnetic induction device 101 is a double-side charging device (i.e., consuming devices 207 can be charged at both sides of the array of unit coils 102), so that unit coils 102 can correspond to one or more consuming devices 207. When a first device in one side of the magnetic inductive device 101 is monitored as fully charged, the unit coils 102 can be reconfigured to combine with other unit coils forming a new primary coil to charge a second consuming device on the other side of magnetic induction device 101 in some embodiments. Flow 300 can begin whenever a new consuming device 207 is detected in some embodiments.

Figure 4:
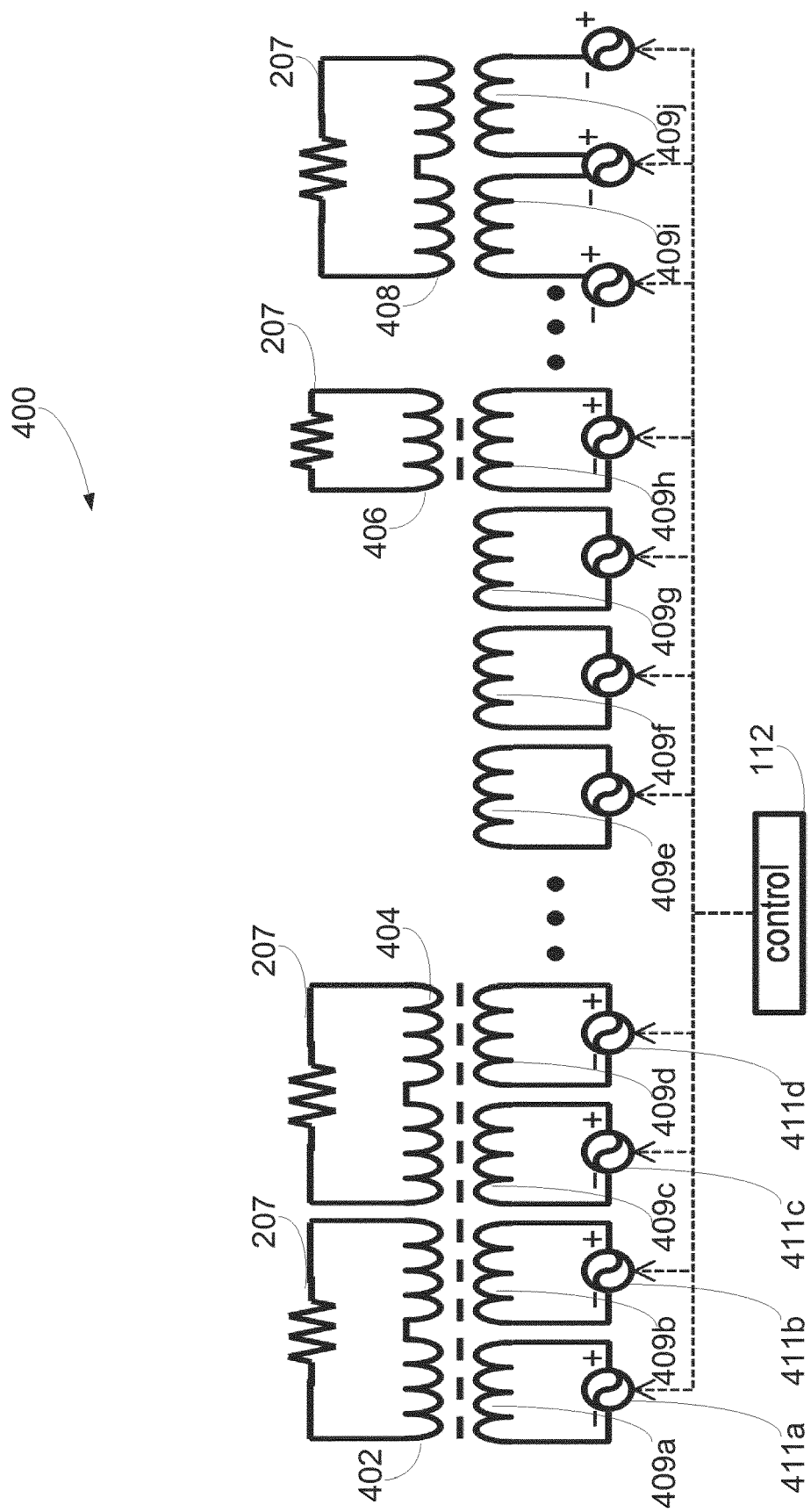
FIG. 4 is an electric circuit diagram of a wireless charging system according to some exemplary embodiments.

FIG. 4 shows a wireless charging system according to an exemplary embodiment.

Referring now to FIG. 4, wireless charging system 400 transfers energy between coils 402, 404, 406, 408 and coils 409a-j through electromagnetic induction. Individual coils or sets of coils of coils 409a-j are selected for operation in accordance with the characteristics of coils 402, 404, 406, and 408 in some embodiments. In some embodiments, coils 402, 404, 406, 408 are secondary coils in or adapted to a respective consuming device 207. Coils 409a-j are unit coils or sets of unit coils 102 in the array of unit coils 102 (FIG. 1). Control system 112 can be used to control and configure the unit coils 409a-j. Although described above and below as having conventional coils, consuming devices 207 can include coil structures similar to array of coils 102 without departing from the scope of the invention. Consuming devices 207 can have an array of coils similar to coils 102 configured for operation as a secondary coil in some embodiments.

Coils 409a-d are connected to a power source in parallel according to one embodiment. In some embodiments, coils 409a-d are connected to different power sources 411a-d, respectively, thereby allowing flexibility in shaping field strength for coils 402 and 404. Selecting appropriate coils 409a-d and power provided to coils 409a-d for coils 402 and 404 allows for efficient operation as only necessary coils 409a-j are selected for operation. In another example, coil 409h is selected for operation with coil 406. Coils 409e-g can be unpowered to save power.

In some embodiments, coils 409a-j are connected to one or more power sources in series. For example, coils 409i-j are coupled in series as opposed to parallel in some embodiments. Coils 409i-j are selected to match coil 408 in some embodiments. Coils 409i-j are configured to create a magnetic field to induce a voltage in coil 408 in some embodiments. In some embodiments, the field is chosen to match the capacity of coil 408.

Figure 5:
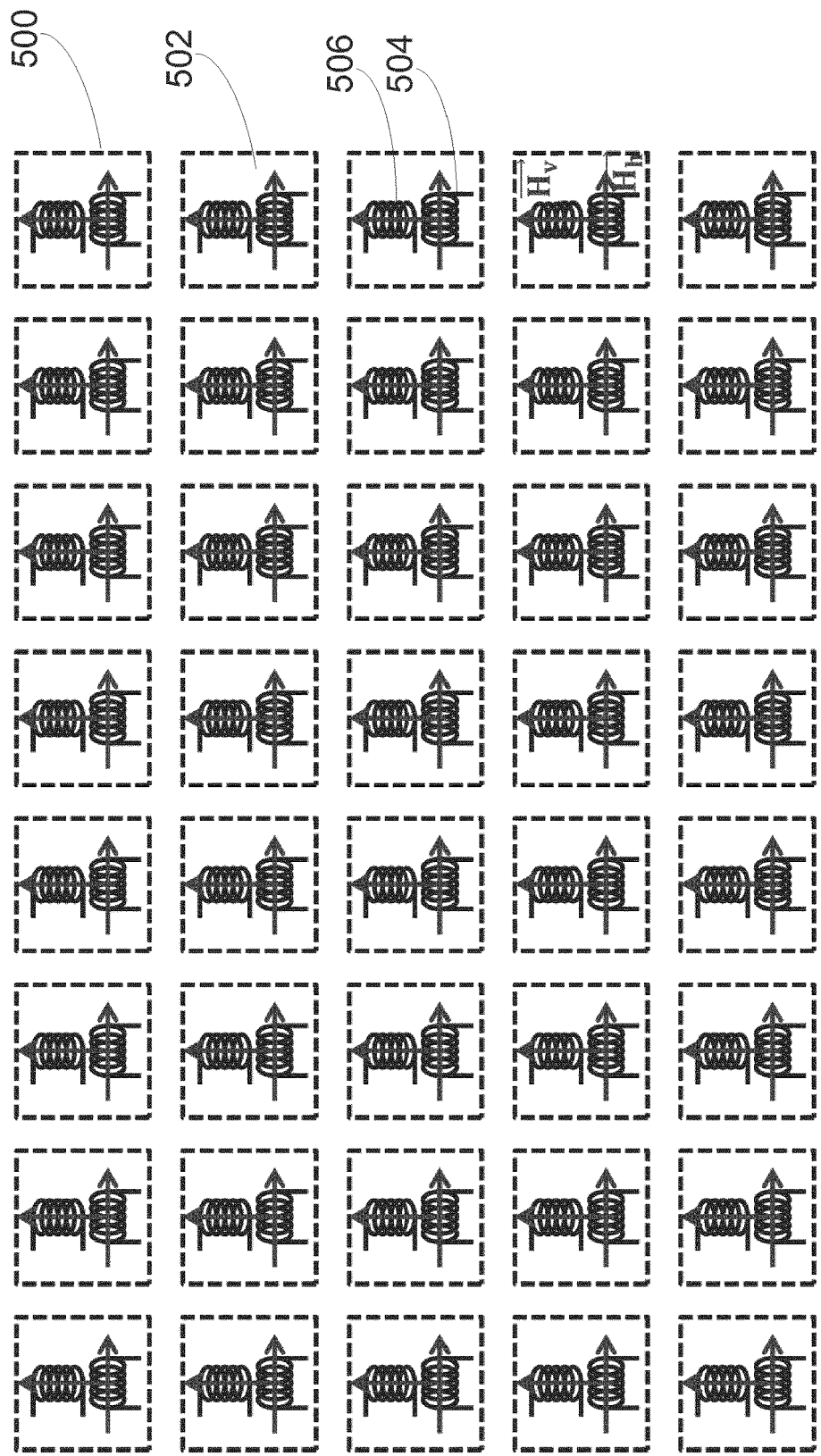
FIG. 5 is a general block diagram of an array of unit coils for the configurable wireless charging system illustrated in FIG. 1 according to some exemplary embodiments.

FIG. 5 is a diagram of an array of unit coils according to an exemplary embodiment. Referring now to FIG. 5, an array 500 of unit coils 502 can be similar to array of unit coils 102 (FIG. 1). Each unit coil 502 can create a magnetic field and includes a coil 504 disposed in a first direction and a coil 506 disposed in a second direction. The first direction is different from the second direction. By separately powering coils 504 and 506, a magnetic field in virtually any direction can be created in some embodiments. A current flow $\vec{J}_v$ in coil 504 (e.g., the horizontal coil) creates a horizontal magnetic field $\vec{H}_h$. A current flow $\vec{J}_h$ in coil 506 (e.g., the vertical coil) creates a vertical magnetic field $\vec{H}_v$. Combining the two vectors $\vec{H}_h$ and $\vec{H}_h$ can generate magnetic field $\vec{H}$. The magnetic field $\vec{H}$ can be controlled by varying the magnitudes of the vertical and horizontal magnetic fields.

In some embodiments, coils 504 and 506 are orthogonal, such as a vertical coil and a horizontal coil. In some embodiments, unit coils 502 are disposed on a printed circuit board. In some embodiments, unit coils 502 are made of any conductive material. In some embodiments, coils 504 and 506 are wire coils or are built on a combination of printed circuit board (PCB) and conductive material. In some embodiments, some of unit coils 502 in the array are made of different materials or have a different geometric arrangement.

One or more unit coils 502 can be selected to form a combined current field and a combined magnetic field. Array 500 of unit coils 502 can be configured to activate and/or deactivate one or more unit coils 502. In some embodiments, array 500 of unit coils 502 can be configured to create multiple magnetic fields simultaneously. Each of the magnetic fields can be used to induce a voltage for charging consuming device 207. The array of unit coils 502 is configured to couple with any type of secondary coils in consuming devices 207 in some embodiments. The configurable nature array 500 of unit coils 502 can charge device efficiently in area and shape in some embodiments. In some embodiments, array 50 of unit coils 502 is disposed in the same plane (i.e., a planar array) as shown in FIG. 5. In some embodiments, array 500 of unit coils 502 is disposed in multiple planes (i.e., a 3D array). For example, array 500 of unit coils 502 is disposed in a wearable charger.

Figure 6:
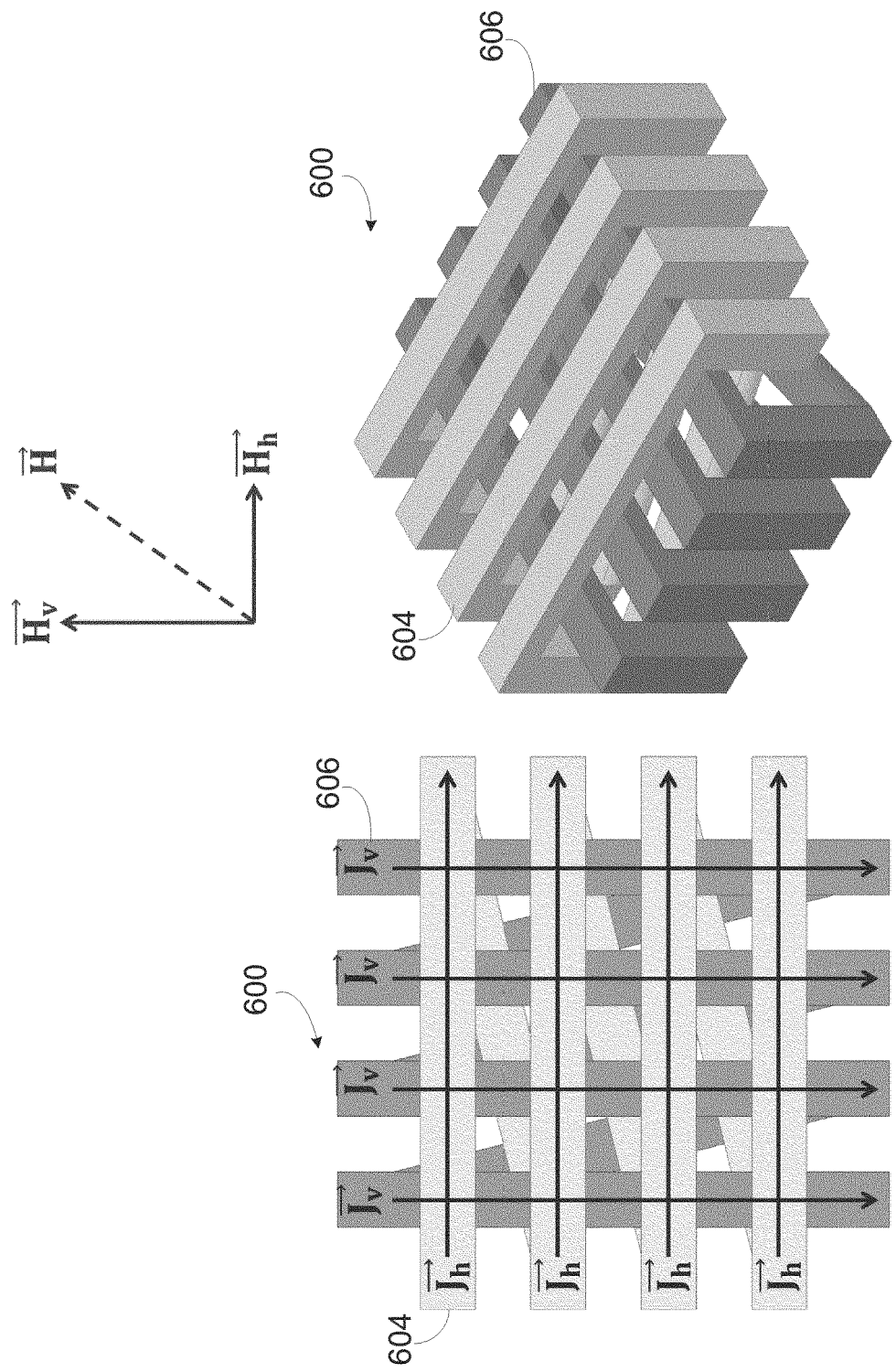
FIG. 6 is a schematic drawing of a unit coil for the configurable wireless charging system illustrated in FIG. 1 according to some exemplary embodiments, the unit coil is shown in a top view and a perspective view.

FIG. 6 is a diagram of a unit coil in different views according to an exemplary embodiment. According to some embodiments, unit coil 600 can be unit coil 502 in array 500 (FIG. 5) or unit coil 102 (FIG. 1). Unit coil 600 includes a coil 604 and a coil 606 which can be each controlled by an individual power source in some embodiments. Unit coils 600 can be configured as printed circuit board coils wherein conductors from coil 604 passes through coil 606 and conductors from coil 606 pass through coil 604. Conductors on a top surface of coil 604 are perpendicular to conductors on a top surface of coil 606 in some embodiments. Conductors on a bottom surface of coil 604 are perpendicular to conductors on a bottom surface of coil 606 in some embodiments.

In some embodiments, the combination of multiple unit coils 600 can generate a high power and a small geometrical magnetic field in a small form factor which makes feasible a very high Q inductor and small geometrical magnetic field. In some embodiments, coils 604 and 606 are orthogonal, such as a vertical coil and a horizontal coil. Coils 604 and 606 are provided on a circuit board with four conductive layers (e.g., coil 604 is disposed on layers 1 and 3 connected by conductive vias, and coil 606 is disposed on layers 2 and 4 connected by conductive vias) in some embodiments.

Figure 7:
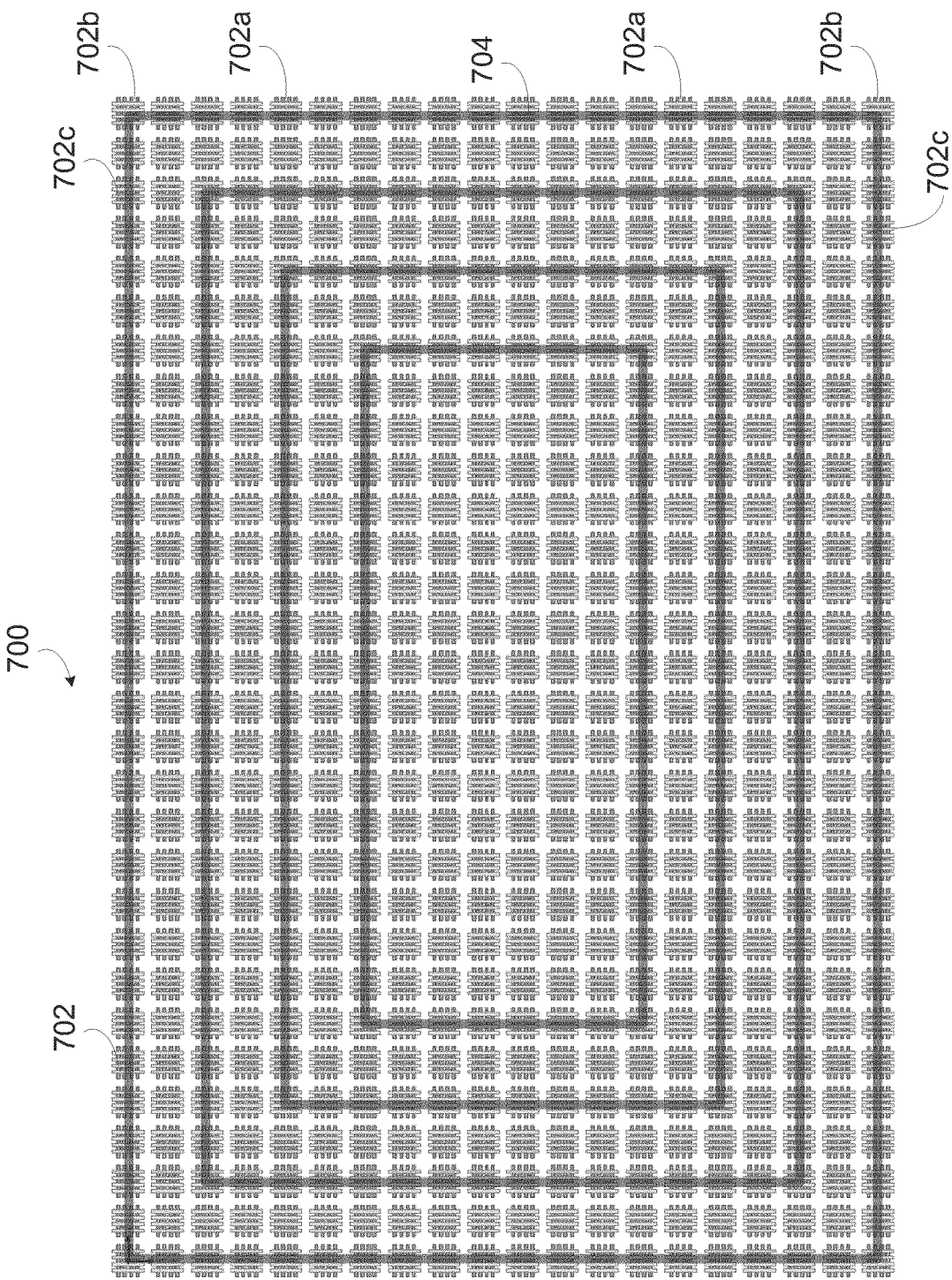
FIG. 7 is a top view schematic drawing of charging lines generated by an array of unit coils for the configurable wireless charging system illustrated in FIG. 1 according to some exemplary embodiments.

FIG. 7 is a diagram of a magnetic field generated by an array of unit coils according to an exemplary embodiment. A planar array 700 of unit coils 702 (similar to unit coils 102, 502, and 600) is configured to provide rectangular rings such as a ring 704. Each selected unit coil 702 is connected to a power source and creates a magnetic field based on a desired configuration. In some embodiments, the magnetic field includes four rectangular line patterns. The line patterns are configured for particular types and numbers of consuming devices 207 in some embodiments. A four-ring rectangular path is created by combining all the unit magnetic fields in each ring. For example, unit coils 702a can be configured to create a magnetic field corresponding to a vertical portion of ring 704 by activating one of the vertical coil or the horizontal coil (e.g., the horizontal coil) and deactivating the other of the vertical coil or the horizontal coil. For example, unit coils 702b can be configured to create a magnetic field with a direction at 45 degrees by activating vertical and horizontal coils. The 45 degree magnetic field can be created by configuring the vertical coil and the horizontal coil in the unit coils 702b generating two magnetic fields with a same amplitude. For example, unit coils 702c can be configured to create a magnetic field corresponding to the horizontal portion of ring 704 by activating one of the vertical coil or the horizontal coil (e.g., the vertical coil) and deactivating the other of the vertical coil or the horizontal coil. In some embodiments, multiple rings or sets of rings are provided where each set or ring is dimensioned for charging a particular separate device.

Figure 8:
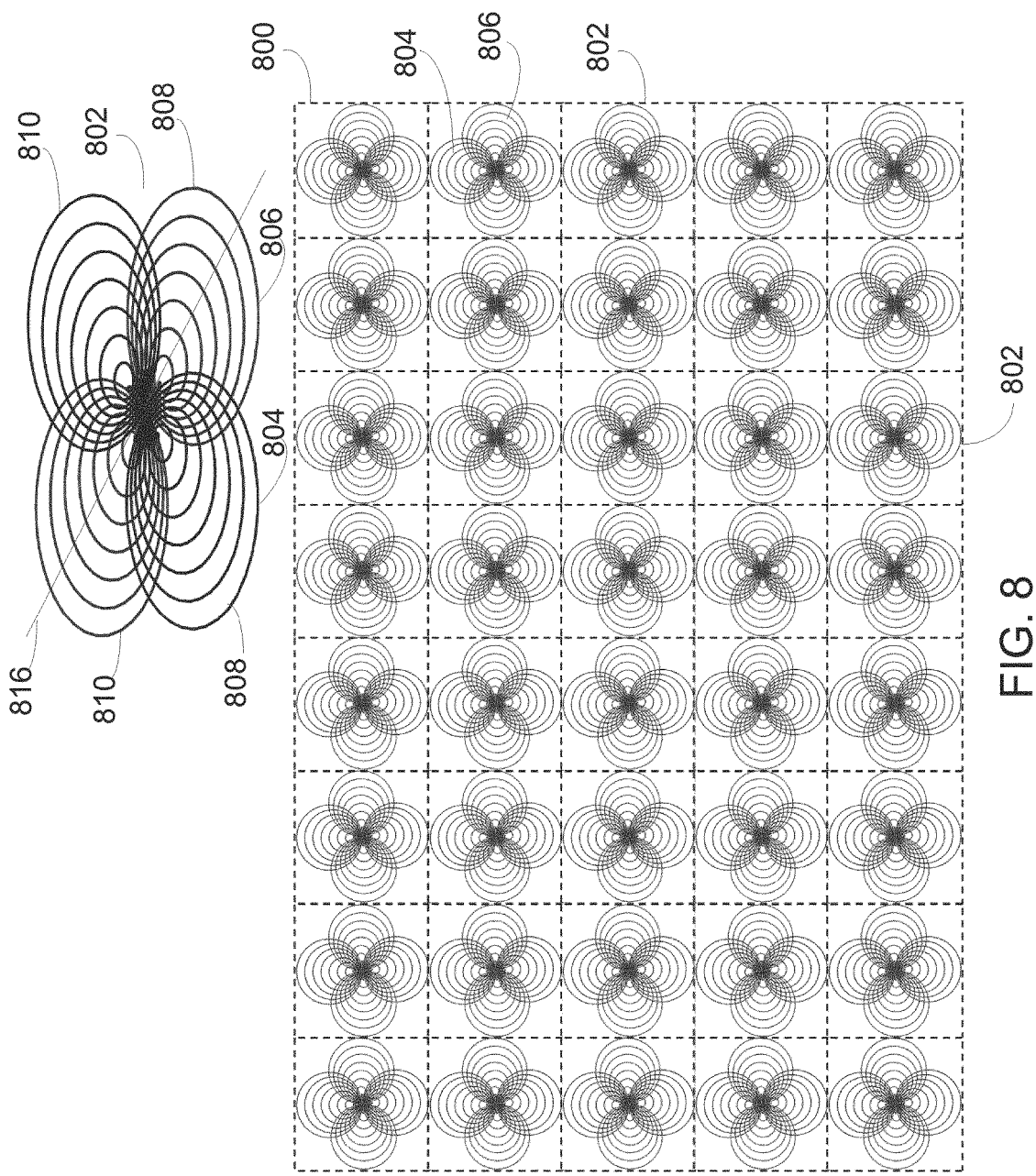
FIG. 8 is a top view schematic drawing of an array of unit eccentric coils for the configurable wireless charging system illustrated in FIG. 1 according to some exemplary embodiments.

FIG. 8 is a diagram of an array of unit eccentric coils according to an exemplary embodiment. An array 800 includes unit eccentric coils 802 (e.g., similar to coils 102, 502, 600, and 702). Unit coils 802 each include an eccentric coil 804 and an eccentric coil 806 in some embodiments. Each of eccentric coils 804 and 806 includes a section 808 and a section 810. Eccentric coils 804 and 806 are disposed in different directions and on different planes in some embodiments. In some embodiments, coils 804 and 806 are orthogonal (i.e., a vertical pair of eccentric coils and a horizontal pair of eccentric coils). In some embodiments, coils 804 and 806 are disposed to provide a magnetic field vector in different directions from each other. In some embodiments, coils 804 and 806 are eccentric dipole spiral coils.

According to one or more embodiments, eccentric coils 804 and 806 are disposed on a printed circuit board. Eccentric coil 804 is disposed on one printed circuit board conductive layer and the other eccentric coil 806 is disposed on another printed circuit board conductive layer. Each of eccentric coils 804 and 806 can be configured individually to create a magnetic field.

Each of sections 808 and 810 is symmetric or nearly symmetric and has an eccentric pattern in some embodiments. In some embodiments, sections 808 and 810 are not symmetric. Sections 808 and 810 are connected by one or more conductors in some embodiments. In some embodiments, section 808 is disposed on a printed circuit board substrate, and section 810 is disposed on the same printed circuit board substrate. Sections 808 and 810 are connected by one or more conductors at an area between sections 808 and 810 to form eccentric coil 804 or 806 in some embodiments. The concentrated parts in both sections 808 and 810 are close to a line 816 of symmetry between sections 808 and 810 in some embodiments. Line of symmetry 816 is shown for coil 804 between section 808 and section 810. Sections 808 and 810 also have symmetric current pattern since they are connected by at least one conductor and have same current direction in some embodiments. For example, section 808 on one side of line 816 of symmetry has a clockwise current pattern, and section 810 in the other side of line 816 of symmetry has a counterclockwise current pattern. Thus, the central part of the combination of sections 808 and 810 has one current direction. The middle concentrated structure allows more current going through the central conductors in order to reduce the negative effect due to opposite currents. The outer less concentrated portions of sections 806 and 810 contribute less to the field strength than the middle concentrated sections in some embodiments. Compared to the conventional coils, this paired eccentric coil arrangement can provide a stronger magnetic field.

Figure 9:
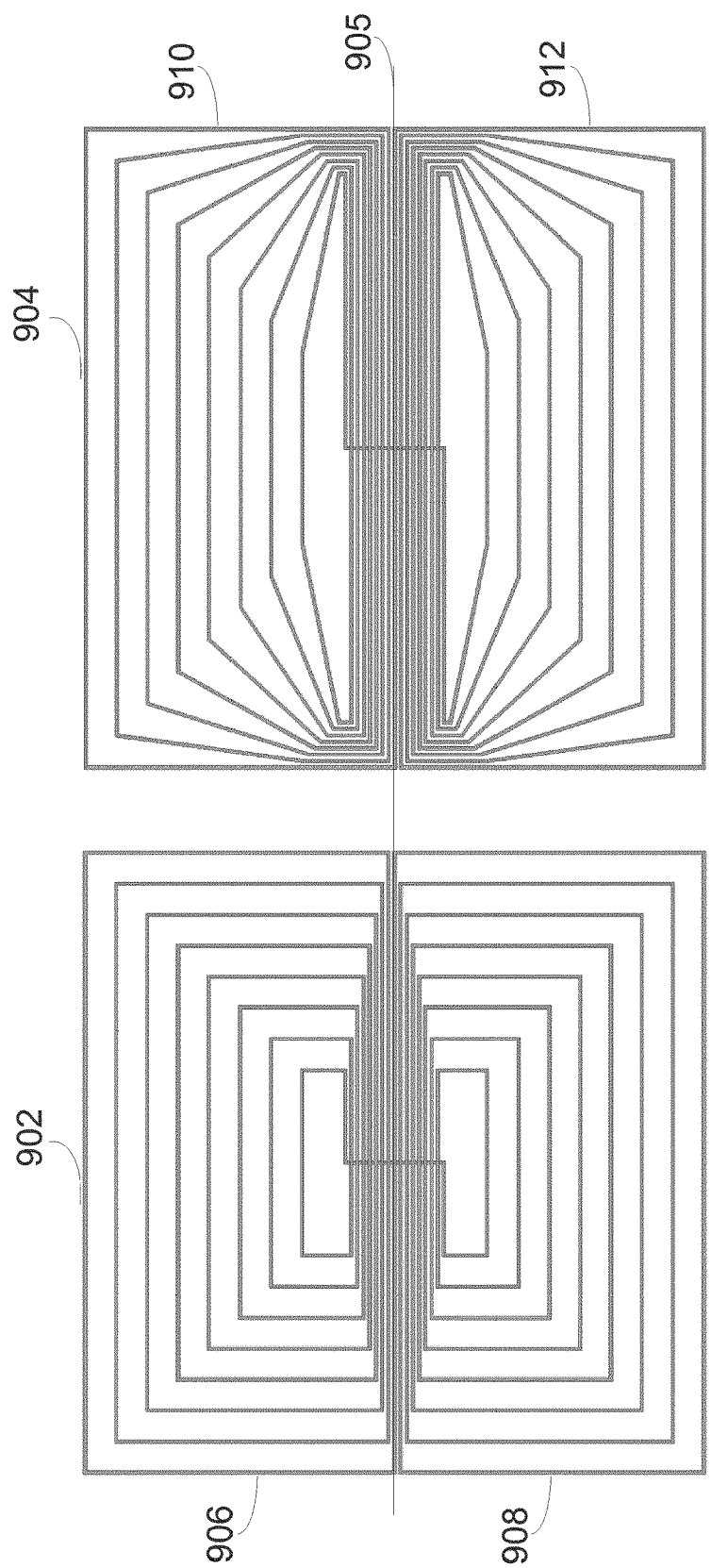
FIG. 9 is a top view schematic drawing of a pair of rectangular unit eccentric coils for the configurable wireless charging system illustrated in FIG. 1 according to some exemplary embodiments.

FIG. 9 is a diagram of two pairs of rectangular eccentric coils with different structures. Referring now to FIG. 9, a rectangular eccentric coil 902 is formed by two rectangular eccentric sections 906 and 908. Coil 902 is similar to coils 804 and 806 (FIG. 8). Sections 906 and 908 can be connected by one or more conductors and disposed symmetrically with concentrated parts close to a central line 905 of symmetry. This central concentrated structure can create a central concentrated current field, which can further create a central concentrated magnetic field. This central concentrated structure also can reduce a negative effect due to opposite current directions in the rectangular coil. Thus, compared to the conventional coils, the central concentrated magnetic field can be much stronger in some embodiments. Rectangular eccentric coils have a smaller size, compared to the conventional coils in some embodiments.

A rectangular eccentric coil 904 is similar to coil 902 and has a structure that provides an advantage according to an exemplary embodiment. More conductive parts (e.g., longer lines) of sections 910 and 912 of rectangular eccentric coil 904 are disposed closely to line 905 of symmetry in some embodiments. This structure can concentrate more current going through the central conductors of eccentric coil 904, which can further create a stronger magnetic field in some embodiments. In some embodiments, rectangular eccentric coils 902 and 904 both have a dimension of 20 mm×20 mm. The smaller size coils use a higher frequency for transferring energy in some embodiments. Thus, a pair of small eccentric coils 902 or 904 can provide a high-efficiency energy transfer, compared to the conventional coils in some embodiments. Coils 902 and 904 can be disposed on a two layer circuit board in some embodiments.

Figure 10:
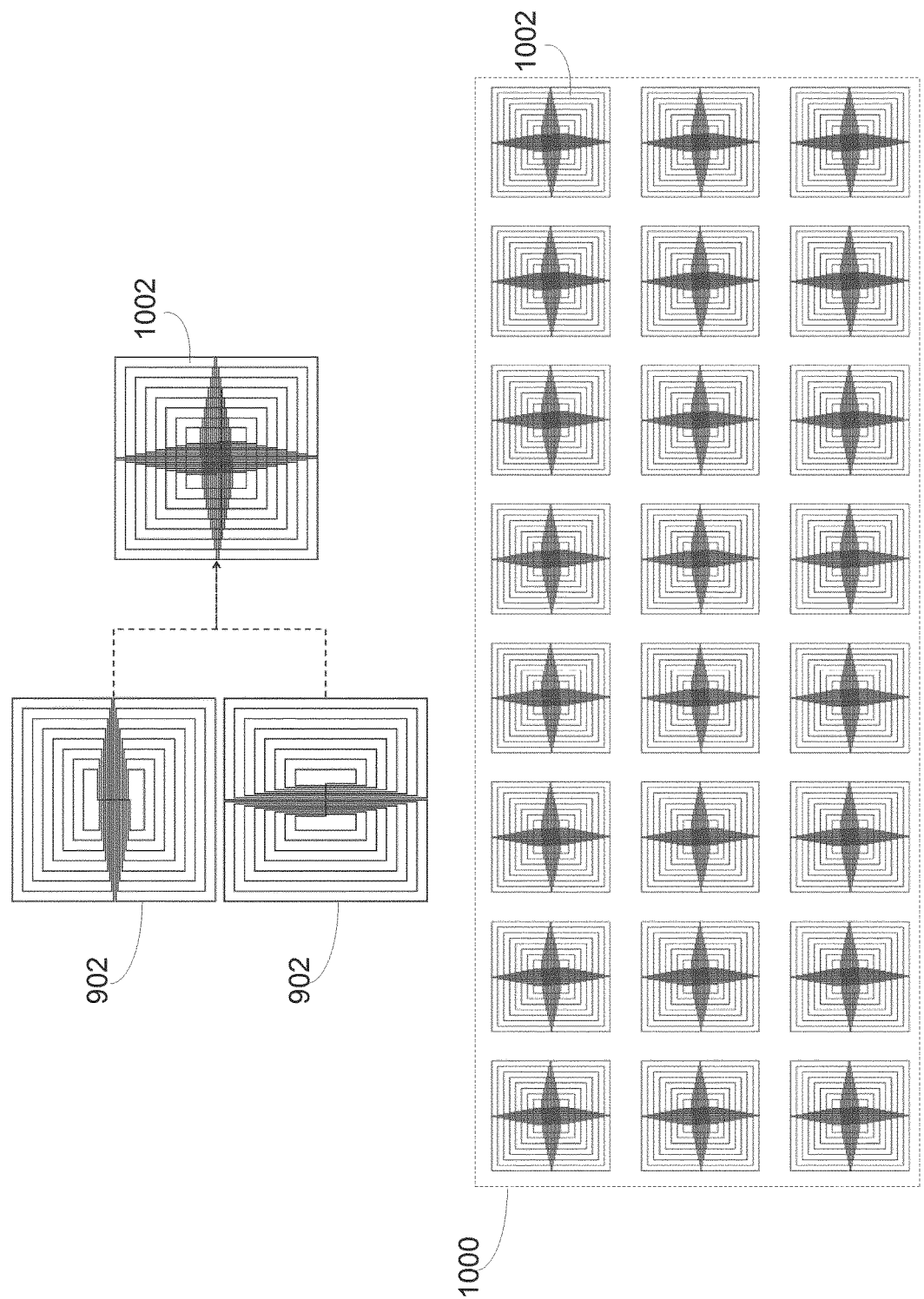
FIG. 10 is a top view schematic drawing of an array of rectangular unit eccentric coils for the configurable wireless charging system illustrated in FIG. 1 according to some exemplary embodiments.

FIG. 10 is a diagram of an array of rectangular unit eccentric coils according to an exemplary embodiment. Referring to FIG. 10, an array 1000 of rectangular eccentric unit coils 1002 can be configured to generate one or more magnetic fields and these magnetic fields can induce one or more voltages in one or more consuming devices 207. Rectangular eccentric unit coils 1002 can be similar to coils 102, 502, 600, 702, and 802. In some embodiments, array 1000 of unit rectangular eccentric coils 1002 is disposed in a single plane as shown in FIG. 10. In some embodiments, array 1000 of unit rectangular eccentric unit coils 1002 is disposed in multiple planes.

Each of rectangular eccentric unit coils 1002 includes two of rectangular eccentric coils 902 in some embodiments. The two rectangular eccentric coils 902 are disposed in different directions. In some embodiments, one is disposed to provide a field in a vertical direction and the other is disposed to provide a field in a horizontal direction. In some embodiments, rectangular eccentric unit coils 1002 are disposed on a printed circuit board. One rectangular eccentric coil 902 is disposed on a printed circuit board conductive layer, and the other rectangular eccentric coil 902 is disposed on another printed circuit board conductive layer. In some embodiments, rectangular eccentric coils 1002 are disposed on a double-side printed circuit board. In some embodiments, unit rectangular eccentric unit coils 1002 include two rectangular eccentric unit coils 904.

Figure 11:
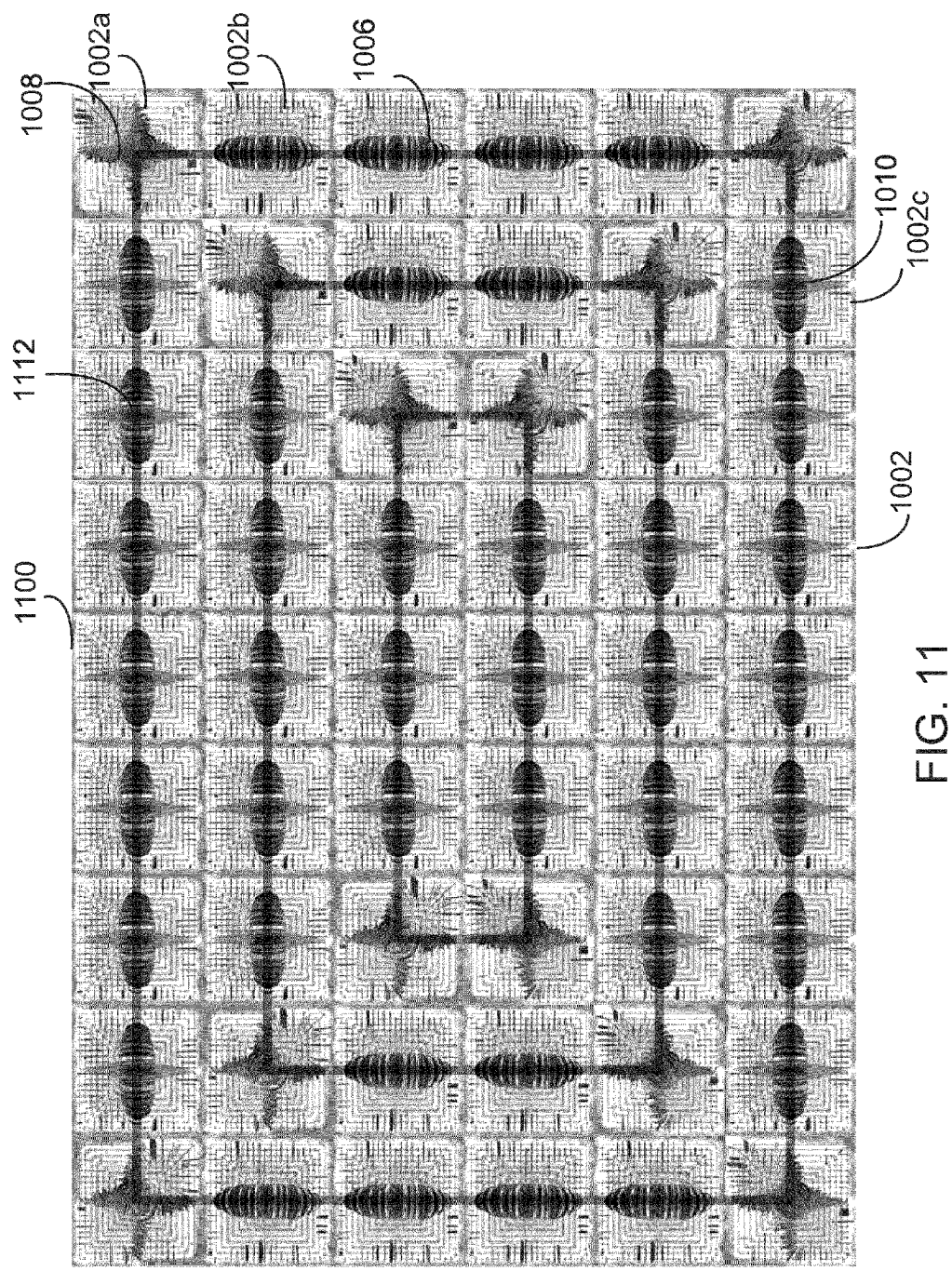
FIG. 11 is a top view schematic drawing of a magnetic field generated by an array of rectangular unit eccentric coils for the configurable wireless charging system illustrated in FIG. 1 according to some exemplary embodiments.

FIG. 11 is a representation of the magnetic field generated by an array of rectangular eccentric unit coils. Referring to FIG. 11, an array 1100 of rectangular eccentric unit coils 1102 includes multiple unit rectangular eccentric unit coils (e.g., pair of coils 904 or coils 902 (FIG. 9) in some embodiments. Each eccentric coil in the unit rectangular eccentric unit coils 1102 can be configured to generate a magnetic field. The magnitude of the generated magnetic field can be controlled by the power source. For example, a large power supply or large power provided from the power supply can generate a strong magnetic field. A unit magnetic field can be formed by combining the two magnetic fields generated by the eccentric coils. The direction of the unit magnetic field can be controlled by varying the magnitudes of the two magnetic fields. Each of unit rectangular eccentric coils 1002 can be configured to form a magnetic field. For example, unit 1002*a* creates a magnetic field 1004 about an axis at 45 degrees. For example, unit 1002*b* creates a magnetic field 1006 about an axis in a vertical direction (e.g., H vector is horizontal). For example, unit 1002*c* creates a magnetic field 1010 about an axis in the horizontal direction (e.g., H vector is vertical). The array of unit coils 1100 can be configured to connect the adjacent magnetic fields (e.g., magnetic fields generated by unit coils 1002*a* and 1002*b*). The connected magnetic fields can form one or more rings 1012 as shown in FIG. 11. The one or more rings can serve as a primary magnetic field to induce a voltage in a consuming device. As shown, the magnetic field extends from the surface of array for coupling with consuming device 207 (FIG. 2). The magnetic field extends in concentrated fashion from array 1100 and can achieve field shapes associated with a U-shaped solenoid coil in some embodiments.

Figure 12:
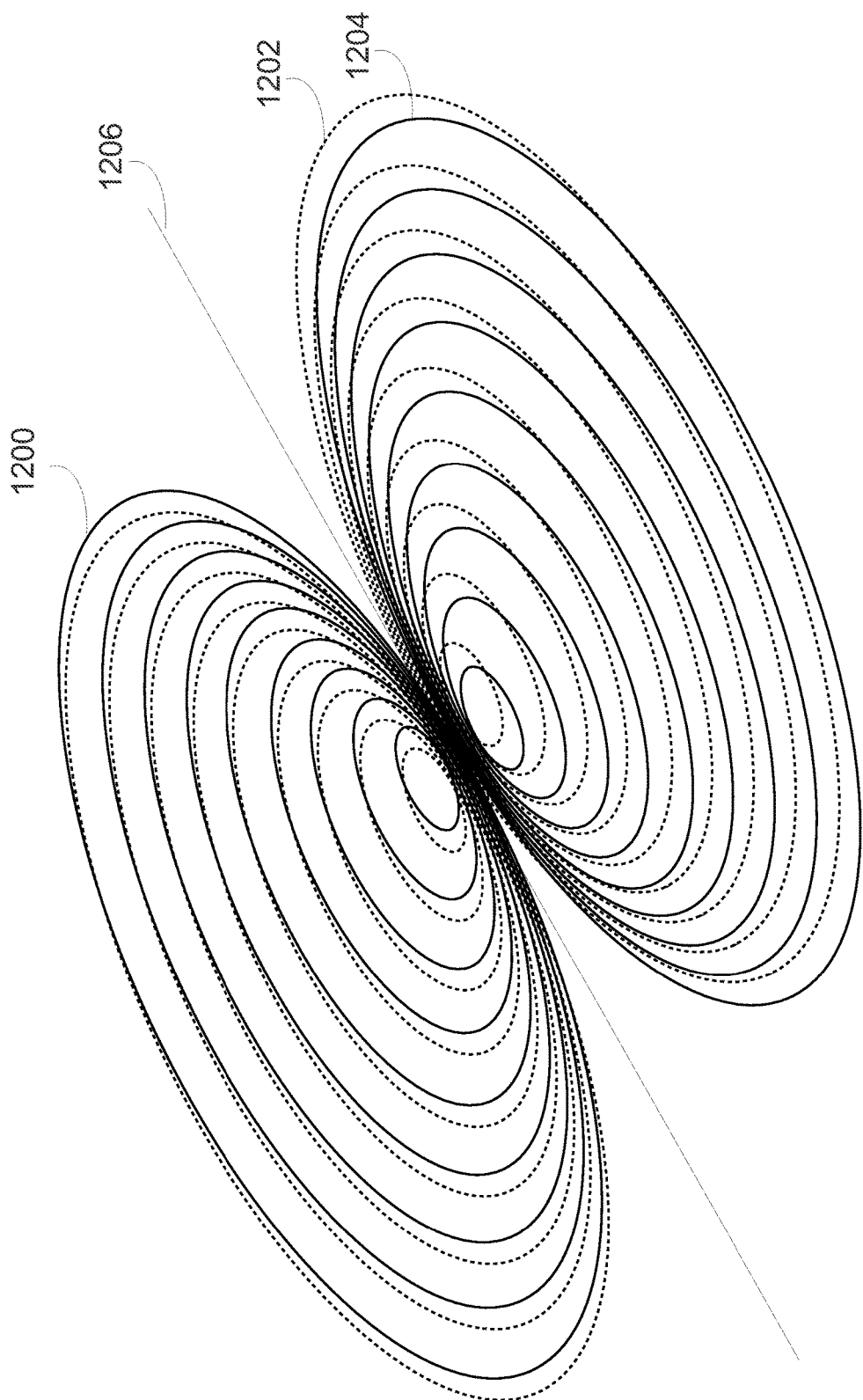
FIG. 12 is a perspective view schematic drawing of double-layer eccentric coil for the configurable wireless charging system illustrated in FIG. 1 according to some exemplary embodiments.

FIG. 12 is a diagram of double-layer eccentric coils. Referring to FIG. 12, double-layer eccentric coils 1200 can be used as a single coil in unit eccentric coils 802 (e.g., unit eccentric coils 802 can include two double-layer eccentric coils 1200 disposed in different directions). Double-layer eccentric coils 1200 include two eccentric coils 1202 and 1204 according to some embodiments. In some embodiments, eccentric coil 1202 is disposed on a printed circuit board conductive layer, and eccentric coil 1204 is disposed on another printed circuit board conductive layer. Eccentric coils 1202 and 1204 each have two sections that are symmetrically disposed and connected by one or more conductors. This structure allows currents concentrated heavily close to a line of symmetry 1206, which further generates a strong magnetic field. The eccentric coils can be any shape. In some embodiments, the double-layer eccentric coils 1200 have small dimensions. In some embodiments, a unit of eccentric coils is composed with two orthogonal double-layer eccentric coils. In some embodiments, eccentric coils 1200 include a triple layer or more eccentric coil.

The disclosure is described above with reference to drawings. These drawings illustrate certain details of specific embodiments that implement the systems and methods and programs of the present disclosure. However, describing the disclosure with drawings should not be construed as imposing on the disclosure any limitations that are present in the drawings. The present disclosure contemplates methods, systems and program products on any machine-readable storage media for accomplishing its operations. The embodiments of the present disclosure can be implemented using circuits, such as processing circuits (e.g., an existing computer processor, or by a special purpose computer processor incorporated for this or another purpose). No claim element herein is to be construed as a "means plus function" element unless the element is expressly recited using the phrase "means for." Furthermore, no element, component or method step in the present disclosure is intended to be dedicated to the public, regardless of whether the element, component or method step is explicitly recited in the claims.

It should be noted that certain passages of this disclosure can reference terms such as "first" and "second" in connection with devices for purposes of identifying or differentiating one from another or from others. These terms are not intended to merely relate entities (e.g., a first coil and a second coil) temporally or according to a sequence, although in some cases, these entities can include such a relationship. Nor do these terms limit the number of possible entities (e.g., coils) that can operate within a system or environment.

It should be understood that the systems described above can provide multiple ones of any or each of those components and these components can be provided on either an integrated circuit or, in some embodiments, on multiple circuits, circuit boards or discrete components. In addition, the systems and methods described above can be adjusted for various system parameters and design criteria, such as shape of coils, coil layers, etc. Although shown in the drawings with certain components directly coupled to each other, direct coupling is not shown in a limiting fashion and is exemplarily shown. Alternative embodiments include circuits with indirect coupling between the components shown.

It should be noted that although the flowcharts provided herein show a specific order of method steps, it is understood that the order of these steps can differ from what is depicted. Also two or more steps can be performed concurrently or with partial concurrence. Such variation will depend on the software and hardware systems chosen and on designer choice. It is understood that all such variations are within the scope of the disclosure.

While the foregoing written description of the methods and systems enables one of ordinary skill to make and use what is considered presently to be the best-mode thereof, those of ordinary skill will understand and appreciate the existence of variations, combinations, and equivalents of the specific embodiment, method, and examples herein. The present methods and systems should therefore not be limited by the above described embodiments, methods, and examples, but by all embodiments and methods within the scope and spirit of the disclosure.

What is claimed is:

1. A method of charging a device, comprising:
configuring an array of unit coils to charge the device, wherein each unit coil comprises:
a first coil configured to provide a first magnetic field in a first direction to charge the device; and
a second coil configured to provide a second magnetic field in a second direction to charge the device, wherein the first direction is perpendicular to the second direction, wherein the first coil and the second coil are orthogonal, wherein at least a portion of conductors of the first coil passes through the second coil; and
providing a magnetic field via the first coils and the second coils of the array of unit coils.

2. The method of claim 1, wherein the first coil for each unit coil is disposed in a first orientation and the second coil for each unit coil is disposed in a second orientation, the first and second orientations being different from each other.

3. The method of claim 2, wherein the first orientation has a first coil center line that is vertical and the second orientation has a second coil center line that is horizontal.

4. The method of claim 3, wherein the first coil is disposed on a printed circuit board substrate and the second coil is disposed on the printed circuit board substrate, wherein the first coil comprises at least one conductor provided through the second coil and the second coil comprises at least one conductor provided through the first coil.

5. The method of claim 1, wherein each unit coil comprises a printed circuit board coil arranged in a planar eccentric shape, whereby a negative effect due to opposite currents are reduced.

6. The method of claim 1, wherein the array of unit coils is configured for a multiple device charging mode or a single device charging mode.

7. The method of claim 1, wherein the array of unit coils is automatically configured by sensing a mobile device type.

8. A magnetic induction device, comprising:
an array of unit coils configured for coupling separately to a power source to charge a device, each unit coil comprising:
a first coil configured to provide a first magnetic field in a first direction to charge the device; and
a second coil configured to provide a second magnetic field in a second direction to charge the device, wherein the first direction is perpendicular to the second direction, wherein the first coil and the second coil are orthogonal, wherein the array of unit coils is configurable to provide a magnetic field using the first coils and the second coils, wherein at least a portion of conductors of the first coil passes through the second coil.

9. The device of claim 8, wherein the magnetic field provided by the array of unit coils is used for charging device.

10. The device of claim 8, wherein each unit coil comprises dual planar dual eccentric coils.

11. The device of claim 8, wherein the first and second coils are planar rectangular eccentric coils.

12. The device of claim 11, wherein the rectangular eccentric coils having outside flux lines at least partially arranged in a nonparallel fashion.

13. The device of claim 8, wherein the first coil is disposed in a first orientation and the second coil is disposed in a second orientation, the first and second orientations directions being in different planes, wherein the first coil is a disposed on a printed circuit board substrate and the second coil is disposed on the printed circuit board substrate, wherein the first coil is configured in a planar eccentric pattern and the second coil is configured in a planar eccentric pattern.

14. The device of claim 8, wherein the unit coils are configured to be coupled in a parallel to the power source.

15. The device of claim 8, wherein the first and second coils of each unit coil are arranged as a pair of eccentric coils.

16. A magnetic induction device, comprising:
an array of unit cells configured to charge a device, each unit cell comprising a pair of eccentric coils disposed perpendicular to each other, wherein each eccentric coil is configured with a center concentrated structure and configured to provide a center concentrated magnitude field, the center concentrated magnetic fields of the pair of eccentric coils configured to charge the device, wherein at least a portion of conductors of a first eccentric coil of the pair of eccentric coils passes through a second eccentric coil of the pair of eccentric coils.

17. The device of claim 16, wherein the array of unit cells provides a magnetic field with a three ring flux path using the pairs of eccentric coils.

18. The device of claim 17, wherein each flux path of the three flux ring path is rectangular.

19. The device of claim 16, wherein the array of unit cells provides a plurality of flux paths, wherein each flux path is arranged for one of a plurality of device types.

20. The device of claim 19, wherein a device type is sensed and the flux path is automatically arranged according to the device type.

* * * * *